United States Patent [19]

Jeon

[11] Patent Number: 6,000,023
[45] Date of Patent: Dec. 7, 1999

[54] METHOD FOR PARTITIONING STORAGE REGIONS ON HARD DISK AND COMPUTER SYSTEM ADAPTED TO THE SAME

[75] Inventor: Young-IL Jeon, Kyunggi-do, Rep. of Korea

[73] Assignee: SamSung Electronics Co., Ltd., Kyungki-do, Rep. of Korea

[21] Appl. No.: 08/897,252

[22] Filed: Jul. 18, 1997

[30] Foreign Application Priority Data

Jul. 19, 1996 [KR] Rep. of Korea ...................... 96-29398

[51] Int. Cl.[6] .................................................... G06F 12/00
[52] U.S. Cl. .................................. 711/173; 711/4; 711/11
[58] Field of Search ................................. 711/111, 161, 711/173, 4

[56] References Cited

U.S. PATENT DOCUMENTS

5,136,711  8/1992  Hugard et al. ............................... 710/8
5,600,840  2/1997  Pearce et al. ............................. 711/161
5,675,769  10/1997 Ruff et al. ................................ 711/173
5,706,472  1/1998  Ruff et al. ................................ 711/173

*Primary Examiner*—Jack A. Lane
*Attorney, Agent, or Firm*—Robert E. Bushnell, Esq.

[57] ABSTRACT

A method for partitioning a magnetic hard disk is disclosed which comprises obtaining an ending position of the file allocation table area by using information stored in the boot sector of the hard disk, detecting contents of the file allocation table (FAT) to obtain a starting position of areas, where data is not stored, of the data storage area, and setting the starting position as a starting position of a second of the at least two partition blocks. With the disk partitioning method, the second partition block is overlapped with a part of a first of the at least two partition blocks. Even though program files including a testing program of the computer system are erased from the second partition block (i.e., overlapped region), the computer system can recognize the whole area of the hard disk as an available limit storage region.

9 Claims, 7 Drawing Sheets

METHOD FOR PARTITIONING STORAGE REGIONS ON HARD DISK AND COMPUTER SYSTEM ADAPTED TO THE SAME

CLAIM OF PRIORITY

This application makes reference to, incorporates the same herein, and claims all benefits accruing under 35 U.S.C §119 from an application entitled Method For Partitioning Storage Regions On Hard Disk And Computer System Adapted To The Same earlier filed in the Korean Industrial Property Office on Jul. 19, 1996, and there duly assigned Serial No. 96-29398 by that Office.

FIELD OF THE INVENTION

The present invention relates to a method of recording specific program files on a magnetic disk and, in particular, to a more efficient method for partitioning storage regions on a magnetic hard disk so as to record specific program files in an overlapped region of the storage regions, and a computer system adapted to the same.

BACKGROUND OF THE INVENTION

A hard disk is made of, for example, an aluminum alloy plate also known as a "platter". Coated on the aluminum alloy plate is a magnetic film on which carbon is deposited so as to store data thereon. Once a hard disk drive has been produced, a user cannot immediately use the produced hard disk drive. This is because the magnetic film on the platter is not formatted. Thus the hard disk drive is formatted and thereafter can be used.

A formatting process utilizes a first step of physical formatting, which is called a "low level format", so that the configuration of data patterns is defined to form a number of sectors. A partitioning step is then carried out so that the whole region of the physically formatted hard disk is partitioned into more than one partition block. Then a logical formatting step, called a "high level format", is carried out according to a disk operating system which is loaded on the host personal computer. After that time, the hard disk drive can be used. Each of the partition blocks has an individual address. This individual address is represented by information concerning the head, sector and cylinder. A plurality of consecutive sectors are divided by cylinders.

In the event that a single hard disk is partitioned according to a prior art disk partitioning method, the entire region of the disk can be divided into consecutive partition blocks. As illustrated in U.S. Pat. No. 5,136,711 to James M. Hugard, et al. and entitled System For Multiple Access Hard Disk Partitioning, wherein multiple hard disk partitions for installing multiple incompatible absolute zero sector operating systems are provided. It can be seen that there are no overlapped partitions.

After partitioning the hard disk according to the prior art method, the second region of the hard disk is deleted, the partition block defined by the second region is not included in the first region. Thus, in order to utilize the entire region of the hard disk, a disk partitioning process step must be performed again.

The complexity of personal computers has increased dramatically in recent years. Complex computer systems require similarly complex disk operating systems to support the wide variety of possible system hardware and software configurations available today. During fabrication of such complex personal computers, a testing step must be performed in order to check whether each of the produced computers is normally operated and whether specific program files are normally executed. After termination of the testing, when the complex personal computers are powered off, they may become damaged.

Also, when a computer system is initially operated by the complex operating system, a maker must input some information such as product number, etc. Since a complex operating system, however, has a different product number, it takes a maker a long time to input the specific product information to all the produced computer systems.

To overcome the above described disadvantages, another prior art method is proposed which has the process steps for partitioning a hard disk of produced computer system into two partition blocks, i.e., first and second regions, by a disk duplicating apparatus, duplicating a complex operating system for testing the computer system on the second region of the hard disk, and erasing the operating system duplicated on the second region after testing the computer system using the duplicated operating system. However, the above described method requires a long time in duplicating the complex operating system on the second region of the hard disk. And, even though a maker erases the operating system duplicated on the second region after testing the computer system, a user cannot use the entire region of the hard disk because the hard disk remains partitioned into two partition blocks. This is because an operating system installed in the computer system by a user can recognize only the first region as the entire region of hard disk.

Thus, at least one operating system maker has provided a program capable of booting the complex operating system using a floppy disk without key entry of specific product information to the computer system. In this case, however, the computer system must be booted by a different operating system so as to duplicate operating system files from the floppy disk to the hard disk.

U.S. Pat. No. 5,600,840 to John J. Pearce, et al. entitled Automatic Adjustment Of Disk Space Required For Suspend-To-Disk Operation performs system-to-disk processes utilizing an extended partition form from a part of a native operating system (OS) partition, that is, the extended partition overlaps the OS partition. Additionally, the native partition can be deleted, thereby returning the data blocks to the native OS partition.

SUMMARY OF THE INVENTION

It is therefore an object of the present invention to provide a method for partitioning the entire region of a hard disk into at least two partition blocks having an overlapped region, in which, even though a complex operating system for testing computer systems is duplicated on the overlapped region and then erased after the test of the computer systems, the entire storage area of the hard disk can be utilized by a newly installed operating system.

According to an aspect of the present invention, a method is providing for partitioning a magnetic hard disk into at least two partition blocks. Each of the partition blocks has a boot sector, FAT (file allocation table) and data storage areas. The disk partitioning method comprises the steps of obtaining an ending position of the FAT area by using information stored in the boot sector of said hard disk; detecting contents of the FAT to obtain a starting position of areas, where data is not stored, of said data storage area; and setting the starting position as a starting position of a second of said at least two partition blocks in order that said second partition block is overlapped with a part of a first of said at least two partition blocks. The first partition block is defined by a whole area of said hard disk.

According to another aspect of the present invention, a method is provided for testing a computer system with a hard disk, which is divided into first and second partition blocks. The second partition block is overlapped with a part of said first partition block. The testing method comprises the steps of booting said computer system using a boot file stored in said second partition block; testing said computer system using a test program file stored in said second partition block; and setting said first partition block to be at active state.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1A:
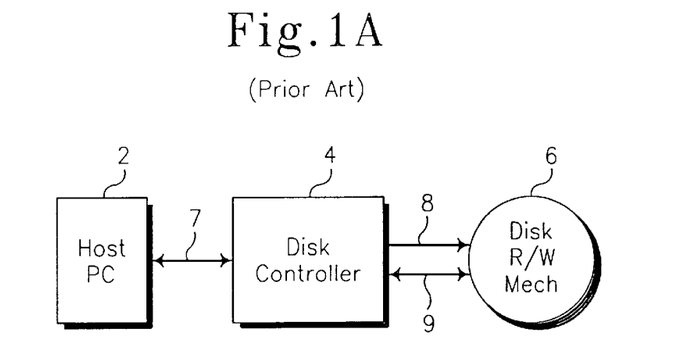
FIG. 1A illustrates the interfacing of a host computer with a disk read/write mechanism.

FIG. 1A shows a basic arrangement for interfacing a host computer 2 with a disk read/write mechanism 6. A microprocessor based disk controller 4, which includes a data storage buffer, is required for such an interface to accept read and write commands from host computer 2 via input/output bus 7 and to control disk read/write mechanism 6 via control lines 8 to read and write information from/to one or more rotating magnetic disks via information line 9.

Figure 1B:
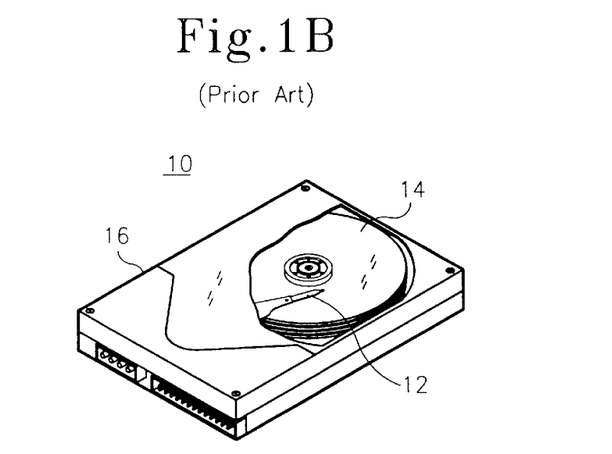
FIG. 1B illustrates a hard disk drive of the disk read/write mechanism shown in FIG. 1A.

The disk read/write mechanism 6 can be, for instance, a hard disk drive 10 which is schematically shown in FIG. 1B. Hard disk drive 10 typically contains five main sections, a data storage media 14, a spindle motor (not shown), a head 12, a case housing 16 and a hard disk controller (not shown) which can be, for instance, disk controller 4 in FIG. 1A. The single motor is provided to rotate data storage media 14 and head 12 to read and write data from/to media 14. The hard disk controller is typically located at the lower side of hard disk drive 10. Data storage media 14 is made of, for example, an aluminum alloy plate also known as a "platter". Coated on the aluminum alloy plate is a magnetic film on which carbon is deposited so as to store data thereon.

Once a hard disk drive has been produced, a user cannot immediately use the produced hard disk drive. This is because the magnetic film on the platter is not formatted. Thus the hard disk drive is formatted and thereafter can be used.

Figure 2:
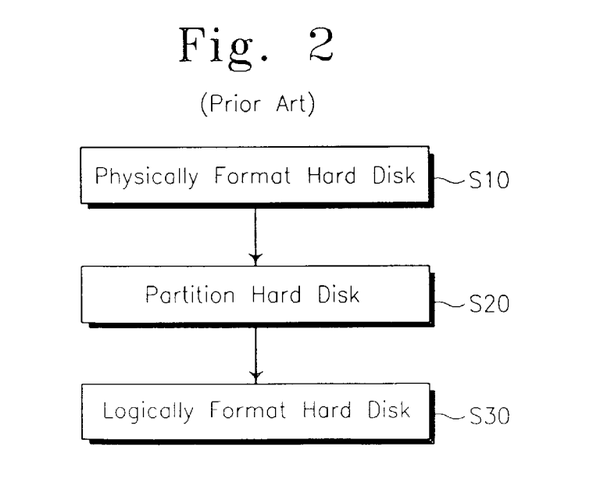
FIG. 2 is a flow chart illustrating how to perform the format operation of the hard disk in the hard disk drive shown in FIG. 1B.

The flow chart of FIG. 2 illustrates a formatting process for a hard disk drive in order to permit the drive to be used. A formatting process of the flow chart is executed in host personal computer 2 of FIG. 1A. First, at step S10, physical formatting, which is called a "low level format", is carried out so that the configuration of data patterns is defined to form a number of sectors.

At step S20, partitioning is carried out so that the whole region of the physically formatted hard disk is partitioned into more than one of partition block.

At step S30, logical formatting, which is called a "high level format", is carried out according to a disk operating system which is loaded on host personal computer 2. After that time, the hard disk drive can be used.

Figure 3:
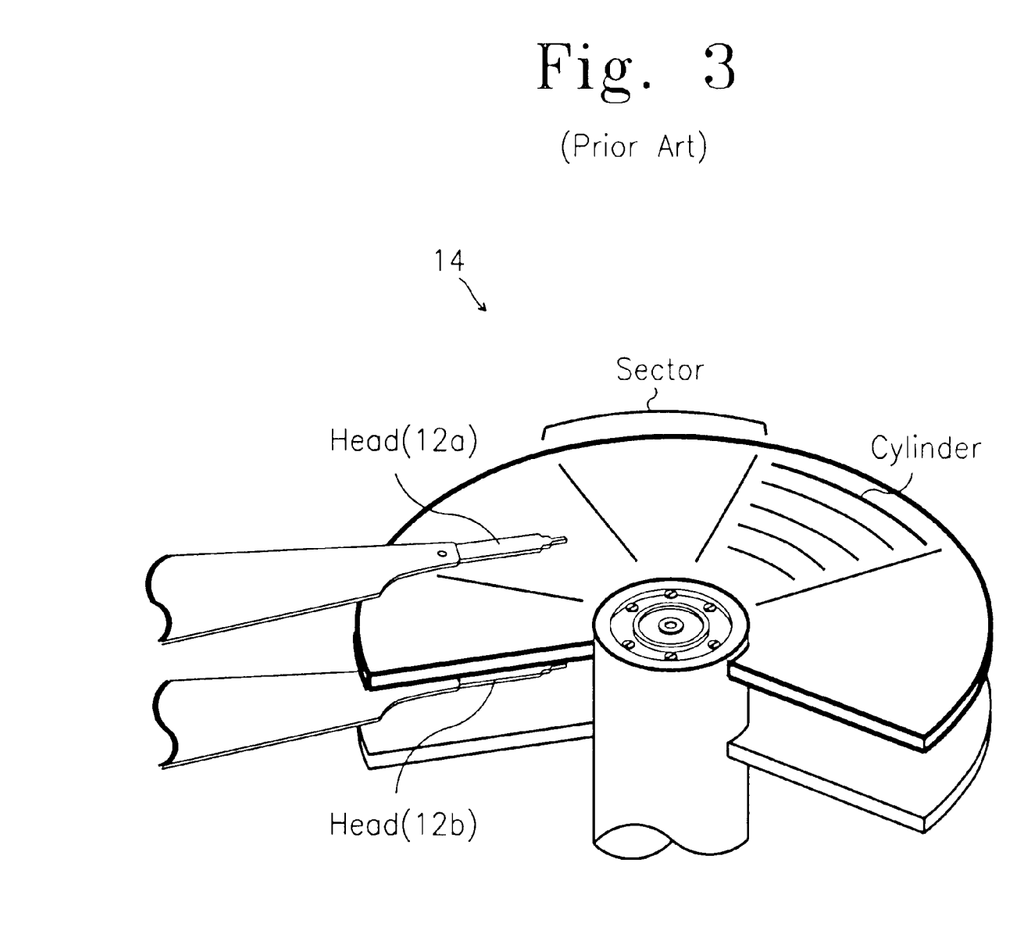
FIG. 3 is, in a perspective view of a portion of the internal structure of the hard disk drive shown in FIG. 1B.

FIG. 3 shows a portion of the internal structure of the hard disk drive shown in FIG. 1B. Each of the partition blocks has an individual address. This individual address is represented by information concerning the head, sector and cylinder. Data may be recorded and read out on/from the top and bottom portions of the platter by means of two heads 12a and 12b. A plurality of consecutive sectors are divided by cylinders.

Figure 4:
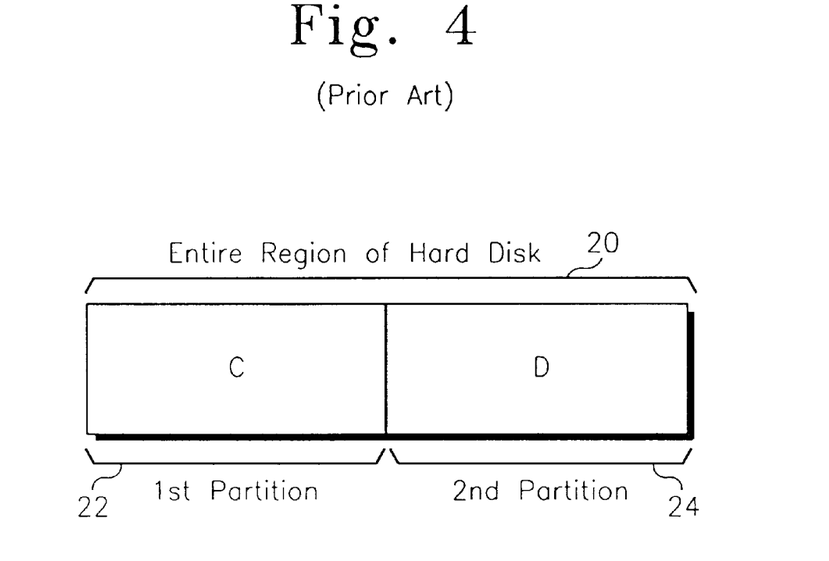
FIG. 4 illustrates, in a block form, a hard disk storage region divided into two partition blocks using the partitioning routine of the formatting operation shown in FIG. 2.

In the event that a single hard disk is partitioned according to the prior art disk partitioning method, the entire region of the disk can be divided into consecutive partition blocks. As illustrated in FIG. 4, the entire region 20 of the disk is divided into two partitioned regions (i.e., first and second regions) 22 and 24 according to a prior art disk partitioning method.

As shown in FIG. 4, it can be seen that there are no overlapped areas between the first and second regions 22 and 24. If the entire region 20 is "L" mega bytes and the first region 22 is "X" mega bytes, the second region is equal to (L−X) mega bytes. Thus if a disk operating system is loaded in first region 22, only X mega bytes are utilized as an available limited storage region which can be recognized by the operating system.

Figure 5:
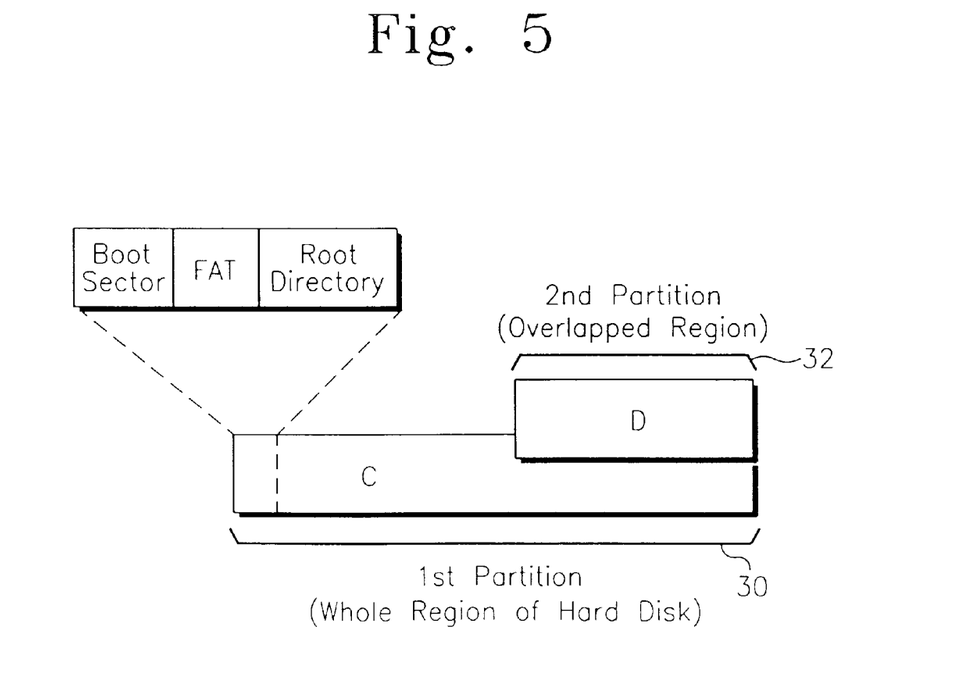
FIG. 5 illustrates, in a block form, a hard disk storage region which has been divided by a novel disk partitioning method according to the principles of the present invention.

Referring to FIG. 5, the hard disk is divided into, for instance, two partitions, a first partition block 30 and a second partition block 32. First partition block 30 is defined by the entire region of the hard disk and second partition block 32 is overlapped with a part of the first partition block 32. Second partition block 32 may be hereinafter called the "overlapped region". First partition block 30 includes a boot sector for storing a loading program (e.g., loader) of an operating system, a FAT (file allocation table) for storing logical cluster status information, and a root directory for allocating specific program and data files in series, as shown in FIG. 5. Similarly to first partition block 30, second partition block 32 has the boot sector, FAT and root directory which are related to an operating system installed therein, even though not shown in FIG. 5.

Figure 6A:
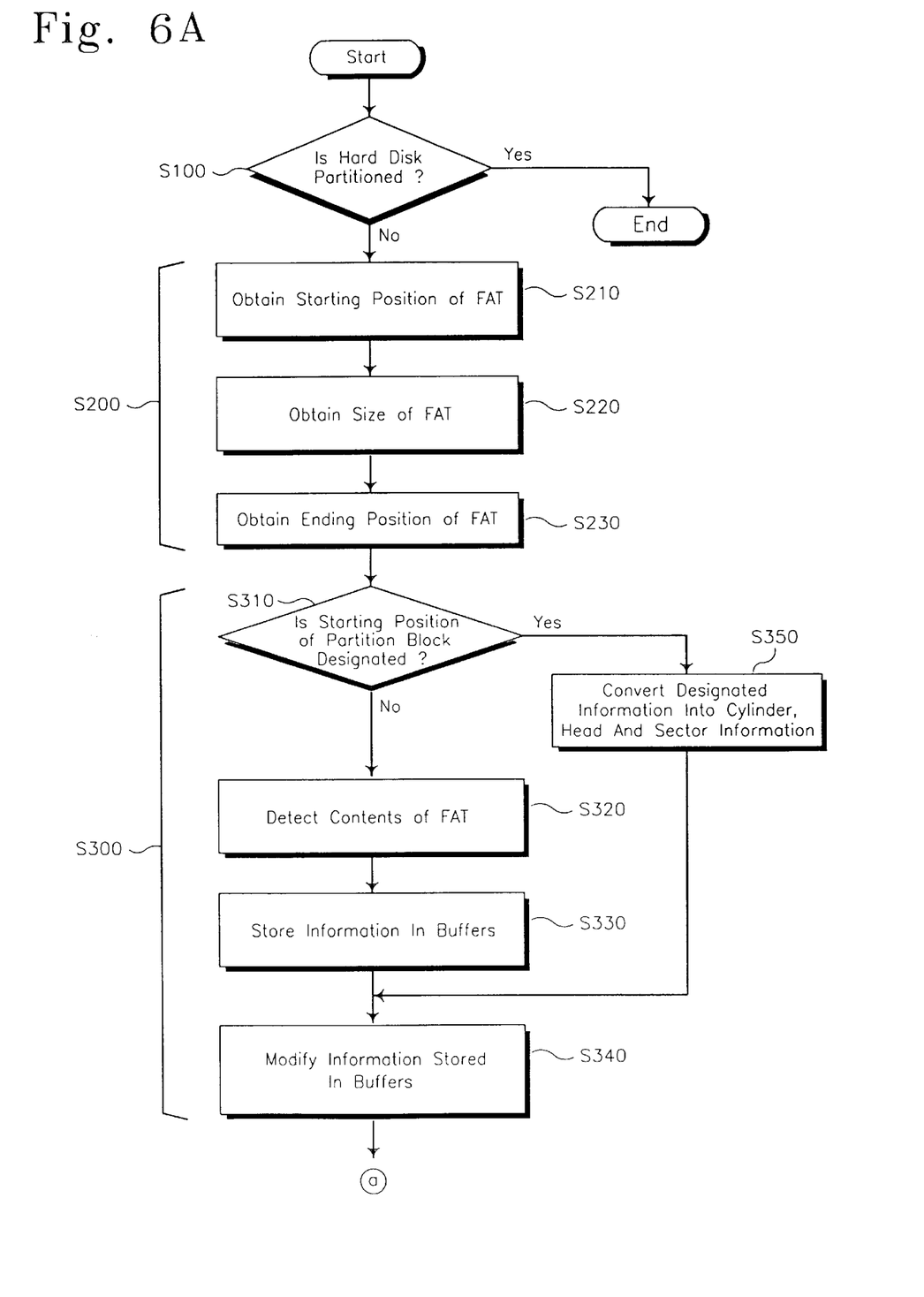
FIGS. 6A–6B illustrate a flow chart of the novel method for partitioning a hard disk in accordance with a preferred embodiment of the present invention.

FIG. 6A is a flow chart illustrating the novel method for partitioning a hard disk in accordance with a preferred embodiment of the present invention. The disk partitioning method may be executed by a host computer associated with its hard disk drive or by a disk duplicating apparatus capable of being associated with the hard disk drive. Particularly, the disk duplicating apparatus is used to duplicate an operating system on the hard disk so as to test whether the computer system is operating normally.

First, it is determined at step S100 of FIG. 6A whether the hard disk is divided into two or more partition blocks (e.g., first and second partitions 30 and 32 shown in FIG. 5). If so, the disk partitioning method is terminated, and if not, the control proceeds to step S210.

At step S210, the starting position (or, starting address) of the FAT is obtained from the boot sector of FIG. 5 and the control proceeds to step S220, wherein the size of the FAT is also obtained from the boot sector. Next, the control proceeds to step S230 so that the ending position (or, ending address) of the FAT is obtained. Accordingly, the information concerning the FAT is obtained by a step 200 having the three process steps S210, S220 and S230.

Subsequently step S300 is performed wherein it is determined at step S310 whether a starting position of second partition block 32 (overlapped region) is designated, for example, by inputs from a user or an operator. If not, the control proceeds to step S320, wherein the starting position of an empty area where data is not allocated by checking contents of the FAT reversely, e.g., from the ending position of the FAT to the starting position thereof, is obtained. For instance, the starting position of the empty area, where data is not stored, of the data storage regions of the hard disk can be obtained by checking the contents of the FAT. At step 330, information concerning cylinder, head and sector corresponding to the starting position of the empty area are respectively stored in three buffers.

On the other hand, at step S310, if the starting position of second partition block 32 (overlapped region) is designated by a user, the control proceeds to step S350, wherein the designated starting position information are converted into cylinder, head and sector information and stored in the first, second and third buffers, respectively.

At step S340, information stored in the buffers are modified so as to substantially define second partition block 32 on the region of the hard disk on the basis of the starting position of the empty area where data is not allocated. For example, the content, i.e., cylinder information, stored in a first of the buffers is incremented, the content (head information) of a second of the buffers is reset to zero and the content (sector information) of a third of the buffers is reset to "1". Thus, the starting position of second partition block 32 can be obtained.

Figure 6B:
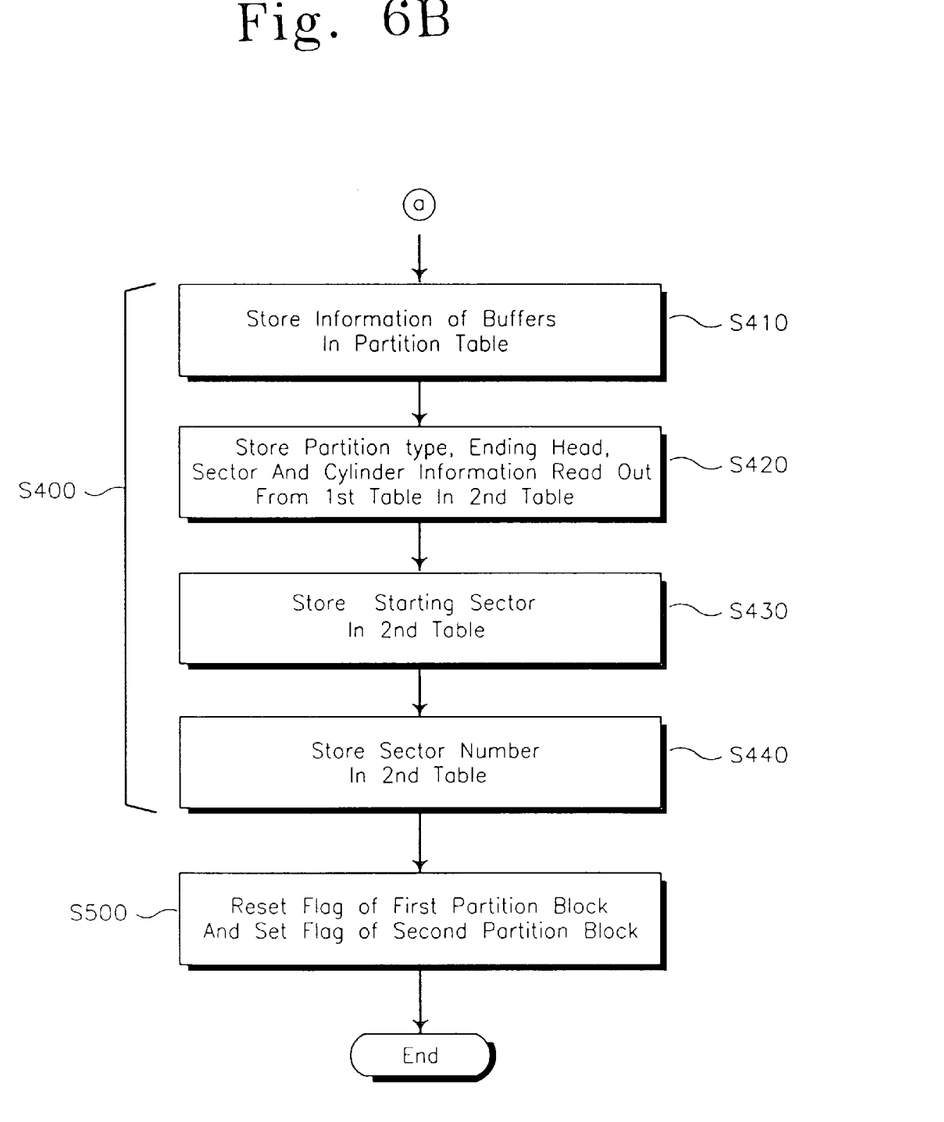
Figure 7:
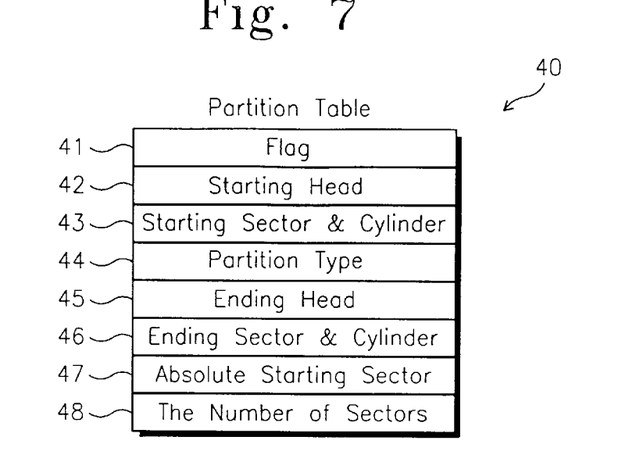
FIG. 7 illustrates the organization of the partition table which is formed in accordance with the novel disk partitioning method of FIG. 6.

The contents of the second partition table 40, shown in FIG. 7, are obtained by steps S400 and S500 of FIG. 6B. At step S410, the contents (i.e., starting head, sector and cylinder information) of the buffers are stored in areas 42 and 43 of second partition table 40. This second partition table 40 is typically stored in the boot sector of second partition block 32.

At step S420, a variety of information such as partition type, and ending head, sector and cylinder information are read out from the first partition table stored in the boot sector of first partition block 30 and stored in areas 44, 45 and 46 of second partition table 40 of second partition block 32.

Because second partition block 32 is overlapped with a part of first partition block 30, the partition type of second partition block 32 is equal to that of first partition block 30. Also, the ending sector and cylinder information of second partition block 32 are equal to those of first partition block 30.

At step S430, an absolute starting sector of second partition block 32 is obtained using the information of the buffers and stored in an absolute starting sector area 47 of second partition table 40. The absolute starting sector ASS can be obtained from following equation:

$$ASS = C \times MHN \times MSN + H \times MSN + S$$

whereas MHN represents the maximum number of heads, MSN represents the maximum number of sectors, and C, H and S represent the cylinder, head and sector information, respectively.

At step S440, the number of sectors defined by second partition block 32 is obtained and stored in an area 48 of the second partition table 40.

Figure 8:
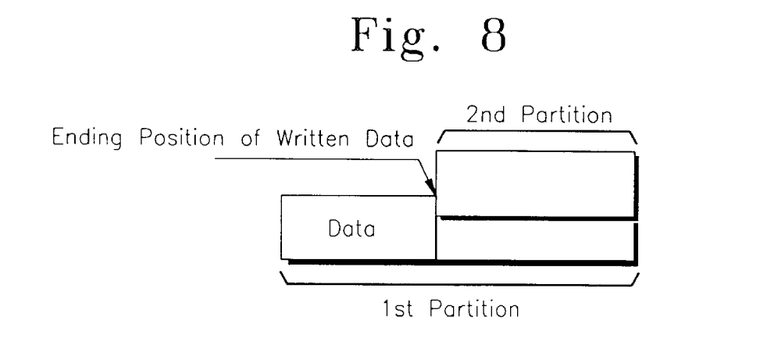
FIG. 8 illustrates an example of the partitioned organization of the hard disk which is partitioned in accordance with the novel disk partitioning method of the present invention.

FIG. 8 illustrates the partitioned organization of the hard disk in the event that the starting position of second partition block 32 is not designated by a user. In FIG. 8, first partition block 30 is set to be the whole area of the hard disk and second partition block 32 is set to be an area which is overlapped with a part of the whole area. It can be seen from FIG. 8 that the starting position of second partition block 32 is equal to the ending position of a data area where data is stored.

Figure 9:
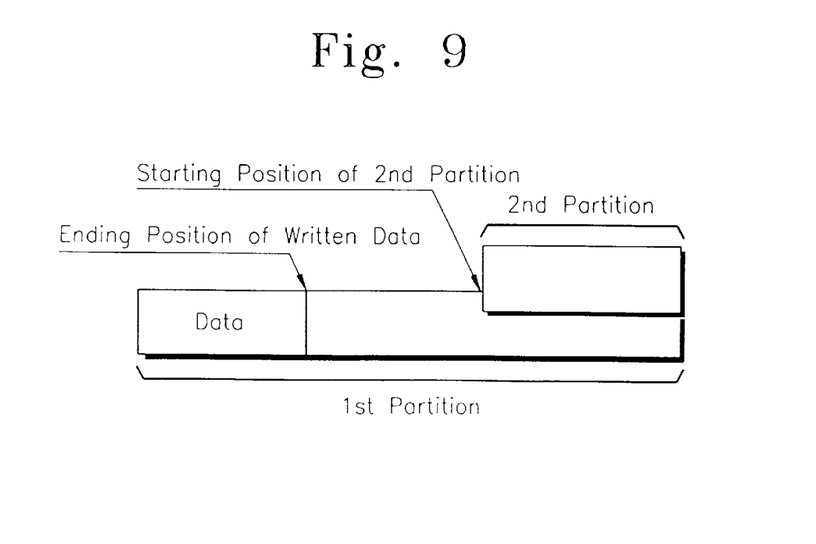
FIG. 9 illustrates another example of the partitioned organization of the hard disk which is partitioned in accordance with the novel disk partitioning method of the present invention.

FIG. 9 illustrates the partitioned organization of the hard disk in the event that the starting position of second partition block 32 is designated by a user.

Referring again to FIG. 6B, at step S500 a flag area of a first partition table (not shown) is reset to make first partition block 30 inactive and at the same time a flag area 41 of second partition table 40 is set to make second partition block 32 active.

As stated above, if a hard disk is divided into more than two partitions (e.g., first and second partition blocks) according to the disk partition method, the first partition block is defined by the whole area of the hard disk and the second partition block is defined by an area which is overlapped with a part of the first partition block. In the event that the hard disk partitioned thus is applied to a computer system, even though all program files stored in the second partition block are erased, the computer system can utilize the whole area of the hard disk by making the first partition block active.

Figure 10:
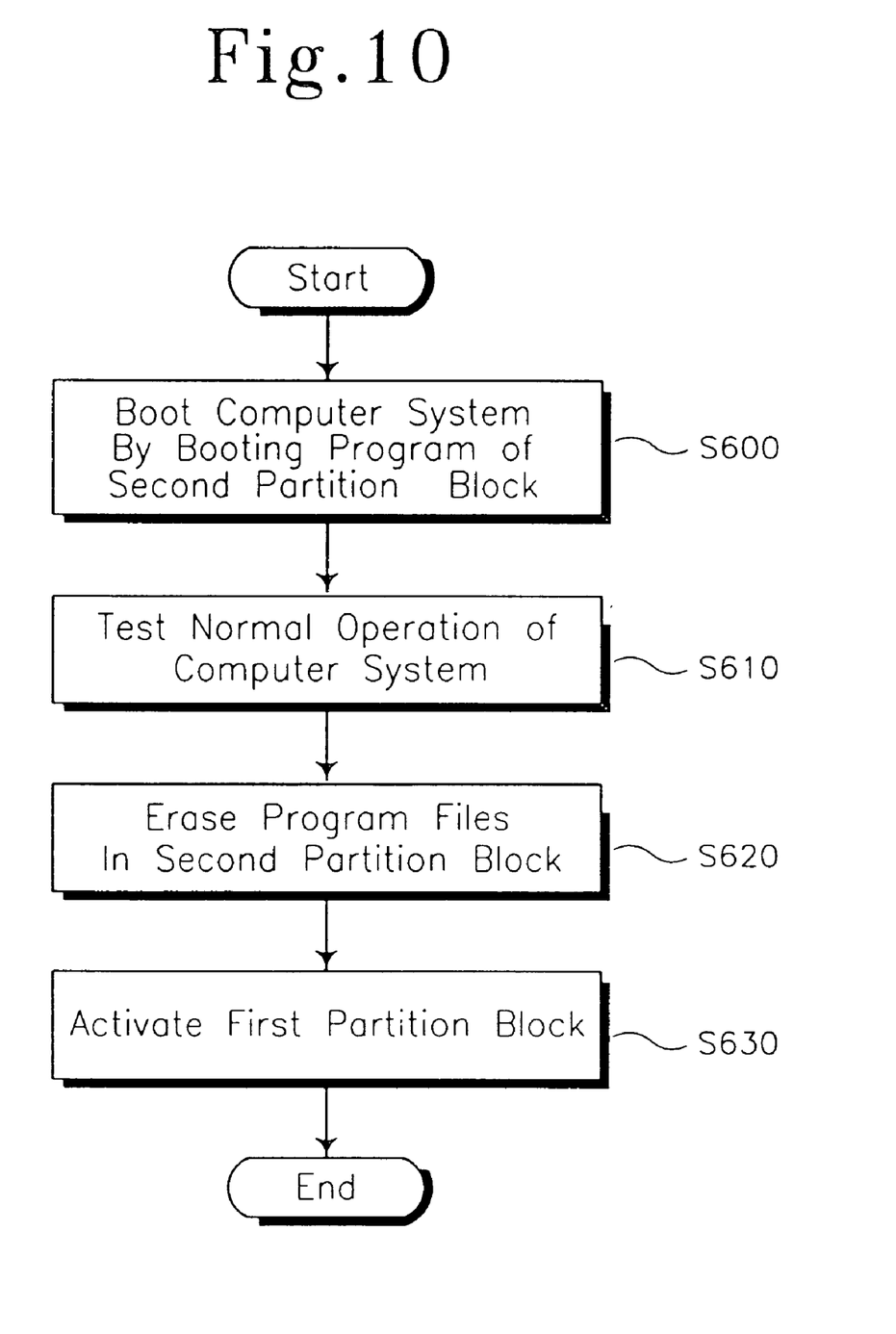
FIG. 10 is a flow chart illustrating the process steps of testing the normal operation of the computer system with the hard disk which is partitioned in accordance with the novel disk partitioning method of the present invention.

FIG. 10 shows the process steps of testing the normal operation of the computer system with a hard disk which has an overlapped partition structure. The hard disk having the overlapped partition structure has first and second partition blocks. It is assumed that the first partition block defined by the whole area of the hard disk is installed with the operating system supplied to the user, and the second partition block (i.e., overlapped region) defined by a part of the first partition block is installed with a testing program.

In FIG. 10, at step S600, when the computer system is powered on so as to test its operation, it is booted by the activation of the second partition block. This is because the second partition block is set to the active state. At step S620, the computer system is checked by using the testing program files stored in the second partition block. After this testing operation, the control proceeds to step S620, wherein the program files are all erased and then the first partition block is set to the active state. Thus, when the computer system is powered on by a user, it will be normally booted in accordance with the installed operating system in the first partition block of the hard disk. Also, since the first partition block of the hard disk is defined by the whole area thereof, the computer system can recognize the whole area as an available storage region.

As described above, according to a disk partitioning method of the present invention, a hard disk is divided into more than two partition blocks of an overlapped partition structure. One of the partition blocks is set to be the whole area of the hard disk and another partition block is set to be an area which is overlapped with a part of the whole area. Thus, even though program files including a testing program of the computer system are erased from another partition block i.e., the overlapped region, the computer system can recognize the whole area of the hard disk as an available storage region. Accordingly, when the hard disk with an overlapped partition structure is applied to a computer system, it is possible to considerably reduce the testing time of the computer system.

What is claimed is:

1. A method for partitioning a magnetic hard disk into at least two partition blocks, each of which has a boot sector, a file allocation table and data storage areas, said method comprising the steps of:

obtaining an ending position of the file allocation table area by using information stored in the boot sector of said hard disk;

detecting contents of the file allocation table to obtain a starting position of areas, where data is not stored, of said data storage area; and setting the starting position as a starting position of a second of said at least two partition blocks in order that said second partition block is overlapped with a part of a first of said at least two partition blocks.

2. The method according to claim 1, wherein said first partition block is defined by a whole area of said hard disk.

3. The method according to claim 1, wherein said step of obtaining the ending position of the file allocation table comprises the steps of:

obtaining a starting position of the file allocation table from the boot sector;

obtaining a size of the file allocation table from the boot sector; and obtaining the ending position of the file allocation table by using the obtained starting position and the size.

4. The method according to claim 1, wherein said step of detecting the contents of the file allocation table to obtain the starting position of said areas, where data is not stored, of said data storage area, comprises the steps of:

determining whether the starting position of said second partition block is designated by a user;

storing cylinder, head and sector information, in three buffers, corresponding to the starting position of said area, when the starting position of said second partition block is not designated by a user;

modifying the information of said buffers so as to set the starting position of said second partition block; and converting information designated, when the starting position of said second partition block is designated by a user, to cylinder, head and sector information to be stored in said buffers.

5. The method of claim 1, wherein said step of setting the starting position as the starting position of said second partition block comprises the steps of:

storing the information of said buffers in a partition table stored in said second partition block;

reading out a second information from a partition table stored in said first partition block; storing the second information read out into a partition table stored in said second partition block in order that partition type, and ending sector and cylinder information of said second partition block are equal to those of said first partition block;

obtaining an absolute starting sector of said second partition block using the information of said buffers to store the absolute starting sector in the partition table of said second partition block; and storing the number of sectors in said second partition blocks in the second partition table of said second partition block.

6. The method of claim 1, further comprising the step of:

resetting a flag of said first partition block to make said first partition block inactive and setting a flag of said second partition block to make said second partition block to make said second partition block active, after setting the starting position as the starting position of said second partition block.

7. A process for partitioning a hard disk into at least two partition blocks, said process comprising the steps of:

determining whether said hard disk is partitioned into more than a first partition block;

ending said process when it is determined that said hard disk is partitioned into more than a first partition block;

obtaining a starting position of the file allocation table from a boot sector;

obtaining a size of the file allocation table from the boot sector; and determining an ending address of the file allocation table according to the obtained starting position and size of the file allocation table;

determining whether a starting position of a second partition block is designated by a user;

detecting contents of the file allocation table to obtain a starting position of areas, where data is not stored, of said data storage area, when it is determined that said starting position of said second partition block has not been designated by a user; and setting the starting position, obtained by said step of detecting contents of the file allocation table, as a starting position of a second partition block in order that said second partition block is overlapped with a part of said first of said at least two partition blocks.

8. The process as set forth in claim 7, further comprising the steps of:

storing cylinder, head and sector information corresponding to the obtained starting position in three buffers;

modifying the information of said buffers so as to set the starting position of said second partition block;

storing the modified information of said three buffers into a partition table;

reading out from a partition table of said first partition block, data corresponding to a partition type, an ending head, sector information and cylinder information and storing said data into said partition table of said second partition block;

obtaining an absolute starting sector of said second partition block and storing said absolute starting sector in said partition table of said second partition block;

obtaining a sector number indicative of the number of sectors defining said second partition block and storing said sector number in said partition table of said second partition block; and resetting a flag area of said partition table of said first partition block to make said first partition block inactive and, at the same time, setting a flag area of said partition table of said second partition block to make said second partition block active.

9. The process as set forth in claim 7, further comprising the steps of:

converting starling position information designated by a user into cylinder, head and sector information, when it is determined that said user has designated said starting position of a second partition block;

storing said cylinder, head and sector information in three buffers;

modifying the information of said buffers so as to set the starting position of said second partition block;

storing the modified information of said three buffers into a partition table;

reading out from a partition table of said first partition block, data corresponding to a partition type, an ending head, sector information and cylinder information and storing said data into said partition table of said second partition block;

obtaining an absolute starting sector of said second partition block and storing said absolute starting sector in said partition table of said second partition block;

obtaining a sector number indicative of the number of sectors defining said second partition block and storing said sector number in said partition table of said second partition block; and resetting a flag area of said partition table of said first partition block to make said first partition block inactive and, at the same time, setting a flag area of said partition table of said second partition block to make said second partition block active.

* * * * *